US009989076B2

(12) United States Patent
Samad

(10) Patent No.: US 9,989,076 B2
(45) Date of Patent: Jun. 5, 2018

(54) MECHANICAL ENERGY HARVESTING DEVICES AND METHODS

(71) Applicant: INDIAN INSTITUTE OF TECHNOLOGY MADRAS, Tamil Nadu (IN)

(72) Inventor: Abdus Samad, Tamil Nadu (IN)

(73) Assignee: INDIAN INSTITUTE OF TECHNOLOGY MADRAS, Chennai (IN)

(*) Notice: Subject to any disclaimer, the term of this patent is extended or adjusted under 35 U.S.C. 154(b) by 301 days.

(21) Appl. No.: 14/384,889

(22) PCT Filed: Oct. 28, 2013

(86) PCT No.: PCT/IB2013/059705
§ 371 (c)(1),
(2) Date: Sep. 12, 2014

(87) PCT Pub. No.: WO2014/068466
PCT Pub. Date: May 8, 2014

(65) Prior Publication Data
US 2015/0233397 A1    Aug. 20, 2015

(30) Foreign Application Priority Data

Nov. 5, 2012 (IN) .......................... 4621/CHE/2012

(51) Int. Cl.
*F15B 15/20* (2006.01)

(52) U.S. Cl.
CPC ......... *F15B 15/20* (2013.01); *Y10T 29/49826* (2015.01)

(58) Field of Classification Search
CPC ........................... F15B 15/20; Y10T 29/49826
(Continued)

(56) References Cited

U.S. PATENT DOCUMENTS 4,914,915 A * 4/1990 Linderfelt ............... F03B 13/22
60/497
5,770,893 A * 6/1998 Youlton ................ F03B 13/142
290/42
(Continued)

OTHER PUBLICATIONS

Minor Loss Coefficients in Pipes and Tubes Components, The Engineering tool box, accessed at http://web.archive.org/web/20121005113521/http://www.engineeringtoolbox.com/minor-loss-coefficients-pipes-d_626.html, accessed on Feb. 16, 2016, pp. 2.
(Continued)

*Primary Examiner* — Thomas E Lazo

(57) ABSTRACT

Methods and systems for harvesting mechanical energy for transformation into electrical energy are described. An energy harvesting apparatus may include a housing having fluid disposed therein and a piston assembly configured to move within the housing in one of an extension stroke and a compression stroke. The piston assembly may include a bidirectional rotor configured to rotate responsive to the piston assembly moving in either of the extension stroke and the compression stroke. The bidirectional rotor may be connected to a rotary generator such that rotational energy generated by rotation of the bidirectional rotor may be transferred to the rotary generator. Electrical energy may be produced by the rotary generator responsive to receiving the rotational energy.

21 Claims, 4 Drawing Sheets

(58) Field of Classification Search
USPC .......................................................... 60/398
See application file for complete search history.

(56) References Cited

U.S. PATENT DOCUMENTS

| | | | |
|---|---|---|---|
| 6,360,534 B1* | 3/2002 | Denniss | E02B 9/08 |
| | | | 415/4.2 |
| 7,077,080 B2* | 7/2006 | Schmuecker | F02B 71/04 |
| | | | 123/46 R |
| 7,372,172 B2 | 5/2008 | Winkler et al. | |
| 8,063,498 B2* | 11/2011 | Namuduri | B60G 13/14 |
| | | | 290/1 R |
| 2007/0205881 A1 | 9/2007 | Breed | |
| 2009/0260935 A1 | 10/2009 | Avadhany et al. | |
| 2010/0072760 A1 | 3/2010 | Anderson et al. | |
| 2010/0219641 A1 | 9/2010 | Namuduri et al. | |
| 2010/0219798 A1 | 9/2010 | Namuduri et al. | |
| 2010/0244457 A1 | 9/2010 | Bhat et al. | |
| 2010/0262308 A1 | 10/2010 | Anderson et al. | |
| 2010/0270801 A1 | 10/2010 | Liu | |
| 2011/0084503 A1 | 4/2011 | Li et al. | |
| 2011/0266801 A1 | 11/2011 | Sainio | |

OTHER PUBLICATIONS

Total Pressure or Head Loss in Pipe or Duct Systems, The Engineering tool box, accessed at http://web.archive.org/web/20121027170816/http://www.engineeringtoolbox.com/total-pressure-loss-ducts-pipes-d_625.html, accessed on Feb. 16, 2016, pp. 2.

Wind Power, accessed at http://web.archive.org/web/20121026163021/http://en.wikipedia.org/wiki/Wind_energy, last modified on Oct. 26, 2012, pp. 29.

Arizti, Harvesting energy from vehicle suspension, Tampere University of Technology, (May 2010) pp. 93.

Ham, LevantPower201, accessed at https://www.youtube.com/watch?v=1lydgKhkStQ, uploaded on Feb. 4, 2011, pp. 2.

Raghunathan, The wells air turbine for wave energy conversion, Progress in Aerospace Sciences (1995), 31(4) pp. 335-386.

Avadhany, Analysis of Hydraulic Power Transduction in Regenerative Rotary Shock Absorbers as Function of Working Fluid Kinematic Viscosity, S.B. Materials Science & Engineering, Massachusetts Institute of Technology (May 2009), pp. 1-29.

Energy Harvesting Shocks, http://mechdb.com/index.php/Energy_harvesting_shocks (printed from internet Aug. 7, 2014).

Falcão, Wave energy utilization: A review of the technologies, *Renewable and Sustainable Energy Reviews*, vol. 14, Issue 3, pp. 899-918 (Apr. 2010).

Feng et al., Green Vehicle Shock Absorbers: Micromachined Wavy Shaped Piezoelectric Cushion Energy Harvester and its Power Generating Demonstration Based on Real Navigation, Transducers'11, Beijing, China (Jun. 5-9, 2011), 743-746.

Gupta et al., Design of electromagnetic shock absorbers, *Int J Mech Mater Des* (May 22, 2007), 3:285-291.

Hedlund, Hydraulic Regenerative Vehicle Suspension, a Thesis submitted to the faculty of the Graduate School of the University of Minnesota (Dec. 2010), pp. 1-38.

International Search Report for International Application No. PCT/IB2013/059705 dated May 7, 2014.

Levant Power: Military Ground Vehicle Applications, http://web.archive.org/web/20120423221045/http://www.levantpower.com/military.html, accessed on Sep. 11, 2014, pp. 1-2.

Paz, Design and performance of electric shock absorber, a Thesis for The Department of Electric and Computer Engineering, Louisiana State University and Agricultural and Mechanical College (Dec. 2004), pp. 1-79.

Zou et al., Design and characterization of an electromagnetic energy harvester for vehicle suspensions, *Smart Materials and Structures* (Feb. 25, 2010), pp. 1-10.

\* cited by examiner

MECHANICAL ENERGY HARVESTING DEVICES AND METHODS

CROSS-REFERENCE TO RELATED APPLICATIONS

This application is a U.S. national stage filing under 35 U.S.C. § 371 of International Application No. PCT/IB2013/59705 filed Oct. 28, 2013, entitled "Mechanical Energy Harvesting Devices and Methods," which claims priority to Indian Patent Application No. 4621/CHE/2012, filed on Nov. 5, 2012, the entire contents of which are incorporated herein by reference in their entirety.

BACKGROUND

Ambient energy is energy generated by an energy source that is released, in one form or another, into the environment. Naturally occurring sources of ambient energy include the sun, wind, and the movement of water. Although there has been some progress in capturing and using ambient solar and wind energy, the vast majority of ambient energy goes unused and is dissipated into the environment, for example, as heat or sound.

One underutilized type of ambient energy is ambient mechanical energy, which generally involves vibrations and other forms of movement. Illustrative sources of ambient mechanical energy include the operation of automobiles, human motion, and structural vibrations. Although each incidence of energy generation by an ambient mechanical energy source may be small, the cumulative effects may be significant.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, an energy harvesting apparatus for regenerating mechanical energy into electrical energy comprises a housing having a fluid disposed therein. A piston assembly may be arranged within the housing. The piston assembly may comprise a piston rod connected to a source of the mechanical energy. The piston rod may be configured to move the piston assembly within the fluid in one of an extension stroke and a compression stroke responsive to receiving the mechanical energy. The piston assembly may also comprise a bidirectional turbine configured to rotate as the piston assembly moves within the fluid in either of the extension stroke and the compression stroke. A rotary generator may be connected to the bidirectional turbine. The rotary generator may be configured to generate the electrical energy responsive to rotation of the bidirectional turbine.

In an embodiment, a method of manufacturing an energy harvesting device configured to regenerate mechanical energy into electrical energy may comprise arranging a piston assembly within a housing having a fluid disposed therein. The piston assembly may comprise a piston rod configured to connect to a source of the mechanical energy and to move the piston assembly within the fluid in one of an extension stroke and a compression stroke responsive to receiving the mechanical energy. The piston assembly may also comprise a bidirectional turbine configured to rotate as the piston assembly moves within the fluid in the extension stroke and the compression stroke. The method may further comprise connecting a rotary generator to the bidirectional turbine such that the rotary generator may generate the electrical energy responsive to rotation of the bidirectional turbine.

In an embodiment, a method of regenerating mechanical energy into electrical energy may comprise providing a piston assembly arranged within a housing having a fluid disposed therein. The piston assembly may comprise a piston rod connected to a source of the mechanical energy and a bidirectional turbine. The method may include the step of exposing the piston rod to the mechanical energy produced by the source such that the piston rod moves the piston assembly within the fluid in one of an extension stroke and a compression stroke. Rotational energy may be generated by rotating the bidirectional turbine as the piston assembly moves within the fluid in either of the extension stroke and the compression stroke. The rotational energy may be imparted to a rotary generator connected to the bidirectional turbine such that the rotary generator may generate electrical energy responsive to receiving the rotational energy.

In an embodiment, a shock absorber for harvesting energy by regenerating vibrational energy generated by a vehicle into electrical energy may comprise a cylindrical housing having hydraulic fluid disposed therein. A piston assembly may be arranged within the cylindrical housing. The piston assembly may comprise a piston rod connected to the vehicle. The piston rod may be configured to move the piston assembly within the hydraulic fluid in one of an extension stroke and a compression stroke responsive to receiving the vibrational energy. The piston assembly may also comprise a bidirectional turbine configured to rotate as the piston assembly moves within the hydraulic fluid in either of the extension stroke and the compression stroke. A rotary generator may be connected to the bidirectional turbine such that the rotary generator generates electrical energy responsive to rotation of the bidirectional turbine.

In an embodiment, an energy harvesting apparatus for regenerating mechanical energy into electrical energy may comprise a housing connected to a source of the mechanical energy. A fluid may be disposed in the housing. A piston assembly may be arranged within the housing and configured to move within the fluid in one of an extension stroke and a compression stroke responsive to the housing receiving the mechanical energy. The piston assembly may comprise a bidirectional turbine configured to rotate as the piston assembly moves within the fluid in either of the extension stroke and the compression stroke. A rotary generator may be connected to the bidirectional turbine such that the rotary generator generates the electrical energy responsive to rotation of the bidirectional turbine.

In an embodiment, a vehicle may be configured to harvest energy by regenerating vibrational energy generated by the vehicle into electrical energy. The vehicle may comprise a suspension system configured to receive the vibrational energy generated during operation of the vehicle and at least one shock absorber. The shock absorber may comprise a cylindrical housing that contains hydraulic fluid. A piston assembly may be arranged within the cylindrical housing. The piston assembly may comprise a piston rod connected to the suspension system. The piston rod may be configured to move the piston assembly within the hydraulic fluid in one of an extension stroke and a compression stroke responsive to receiving the vibrational energy from the suspension system. The piston assembly may comprise a bidirectional turbine configured to rotate as the piston assembly moves within the hydraulic fluid in either of the extension stroke and the compression stroke. A rotary generator may be connected to the bidirectional turbine and may operate to generate the electrical energy responsive to rotation of the bidirectional turbine.

DETAILED DESCRIPTION

The following terms shall have, for the purposes of this application, the respective meanings set for the below.

"Energy harvesting" refers to the process of capturing energy from one or more sources, particularly ambient energy sources. In general, the harvested energy may be transformed into another form of energy. For instance, mechanical energy may be captured and transformed into electrical energy.

"Mechanical energy" refers to energy generated due to the motion of an object. Illustrative forms of mechanical energy include vibrations, oscillations and other types of movement. For example, the movement of water imparts mechanical energy to an object in contact with the water. In another example, a vehicle produces mechanical energy in the form of vibrations during operation of the vehicle, such as driving the vehicle on a road.

Mechanical energy can be harvested for transformation into electrical energy. The mechanical energy may be in the form of vibrations and/or other movement generated at an energy source. An energy harvesting apparatus may operate to receive the mechanical energy from a source, such as a vehicle, a building, or transportation infrastructure. The harvested mechanical energy may be transformed into electrical energy through a generator, such as a rotary generator. An electrical energy receiver, such as a battery or an electronic device, may be configured to receive the electrical energy generated by the energy harvesting apparatus.

Figure 1:
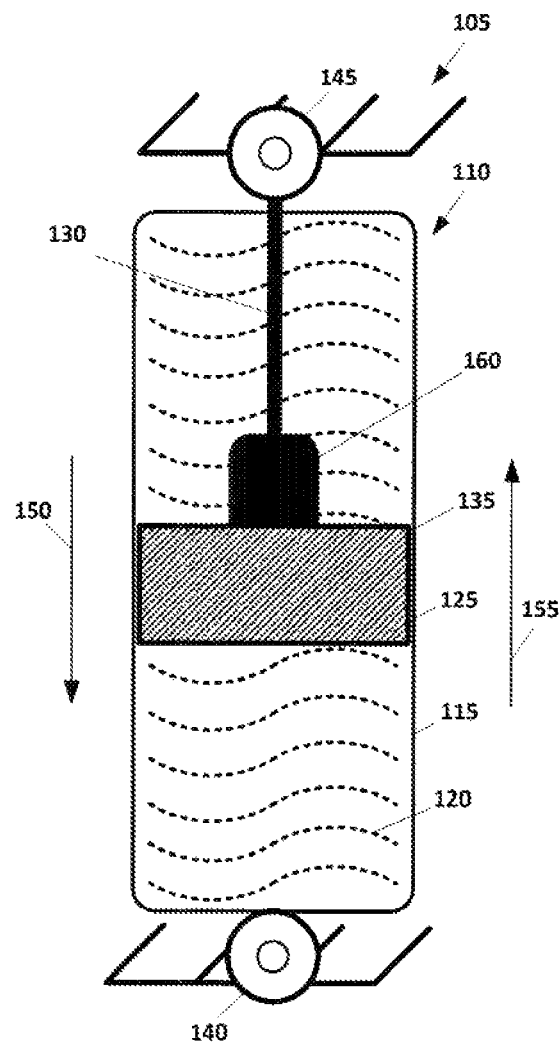
FIG. 1 depicts an illustrative energy harvesting apparatus according to some embodiments.

FIG. 1 depicts an illustrative energy harvesting apparatus according to some embodiments. As shown in FIG. 1, an energy harvesting apparatus 110 may include a housing 115 having a fluid 120 disposed therein. In an embodiment, the fluid may include hydraulic fluid, oil (for example, motor oil), or water. The housing 115 may be sealed such that the fluid 120 may not flow outside of the housing. A first mount 140 and a second mount 145 may operate to mount the energy harvesting apparatus 110 to an energy source 105. A piston assembly 125 may be arranged within the housing 115 in contact with the fluid 120. The piston assembly 125 may be connected to a piston rod 130 configured to move the piston assembly in one of an extension stroke 150 and a compression stroke 155. A sealing area 135 of the piston assembly 125 may operate to seal the piston assembly with the inner surface of the housing 115 such that the fluid 120 does not pass between the piston assembly and the inner surface of the housing. The piston assembly 125 may be configured to slide within the housing using the sealing surface 135.

The energy source 105 may generate mechanical energy. For example, the energy source 105 may be associated with mechanical energy including, without limitation, vibrations, oscillations, wind, and water movement. The mechanical energy may be transferred to the piston rod 130. In response, the piston rod 130 may move the piston assembly 125 proximally and distally, for example, up (compression stroke 155) and down (extension stroke 150). The movement of the piston rod 130 is not limited to up or down movement, as the type of movement depends on the mounting position of the energy harvesting apparatus 110. For instance, the energy harvesting apparatus 110 may be mounted perpendicular to the orientation depicted in FIG. 1, such that the piston rod 130 may operate to move the piston assembly 125 in a right (compression stroke 155) and left (extension stroke 150) motion, or vice versa.

In an embodiment, the energy source 105 may include a vehicle, wherein the first mount 140 is connected to the frame of the vehicle to receive mechanical energy generated by the vehicle during operation, such as vibrations generated as the vehicle is driven on a road. The second mount 145, for instance, may be mounted to an axis of the vehicle. In this manner, the energy harvesting apparatus 110 may operate as a shock absorber in addition to energy harvesting functions. As the vehicle produces vibrations during operation, certain of these vibrations are transferred to the piston rod 130, which, in turn, moves the piston assembly 125 up and down within the housing 115.

In an embodiment, the energy source 105 may include a vehicle including, without limitation, an automobile, a bus, a truck, a motorcycle, a bicycle, a train car, an aircraft, and a watercraft. In another embodiment, the energy source 105 may include a structure, such as a roadway, a bridge, a parking garage, a platform, a tunnel, a building, a telecommunications tower, a radio tower, a water tower, and a chair. In a further embodiment, the energy source 105 may include human motion, wind and the movement of water (for example, water flow or waves).

In an embodiment, the piston assembly 125 may move within the fluid 120 based on the movement of the energy harvesting apparatus 110. For example, the energy harvesting apparatus 110 may be connected to an energy source 105 such that the mechanical energy received by the energy harvesting apparatus moves, or shakes, the energy harvesting apparatus. The shaking of the energy harvesting apparatus 110 may be sufficient to move the piston assembly 125 distally or proximally (for example, up and down or side-to-side, depending on the orientation of the energy harvesting apparatus) within the housing 115, causing the bidirectional turbine to rotate. In this manner, the energy harvesting apparatus 110 does not necessarily require the piston rod 130 to move the piston assembly 125 within the housing 115. In this embodiment, the energy harvesting apparatus 110 may be connected to the energy source 105 such that the vibrations, oscillations, or other movements are sufficient to move the piston assembly 125 within the energy harvesting apparatus. For example, the energy source 105 may operate to shake the energy harvesting apparatus 110 back-and-forth, thereby moving the piston assembly 125 within the energy harvesting apparatus.

Figure 2A:
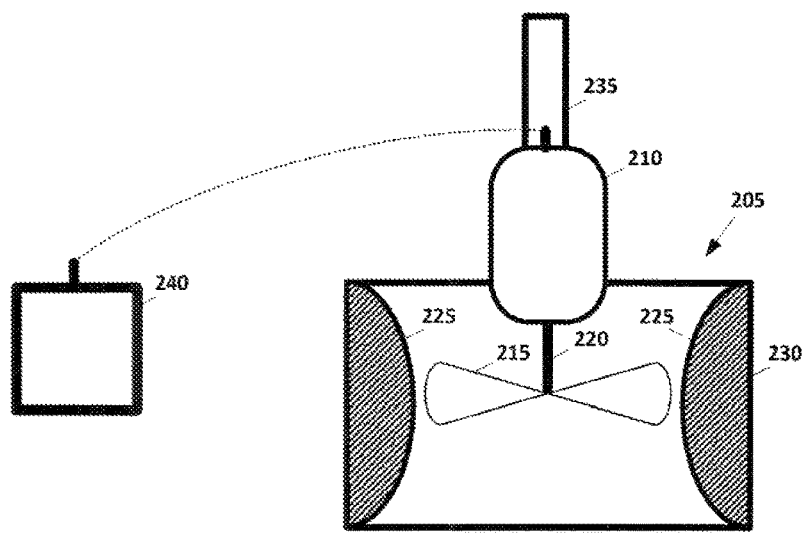
FIG. 2A depicts a cross-sectional view of an illustrative piston assembly according to some embodiments.

As shown in FIG. 2A, as the piston assembly 125 moves up and down within the housing, the fluid 120 is able to move through the top and bottom of the piston assembly because the piston assembly 125 is not completely solid. A bidirectional turbine (illustrated in FIG. 2A) is arranged within the piston assembly 125. As the piston assembly 125 moves up and down, the fluid contacts the bidirectional turbine with increasing velocity, causing it to rotate and/or to rotate at a greater velocity (for example, angular momentum) and to produce more rotational energy. The bidirectional nature of the bidirectional turbine allows the turbine to rotate unidirectionally through the bidirectional flow generated by the extension stroke 150 and the compression stroke 155. This is contrary to conventional turbines, which would only be able to rotate during one of the extension stroke 150 and the compression stroke 155 or would rotate in one direction during the extension stroke and in another direction during the compression stroke. As such, the bidirectional turbine allows the energy harvesting apparatus 110 to generate more rotational energy from the mechanical energy as compared to a conventional unidirectional turbine. In an embodiment, the bidirectional turbine may include an impulse turbine, a Wells turbine, a Savonius turbine, a Darrius turbine, and a Denis-Auld turbine. In another embodiment, the bidirectional turbine may be a single- or multi-stage turbine.

The bidirectional turbine may be connected to an electrical generator 160 configured to generate electricity based on the rotation of the bidirectional turbine. In an embodiment, the electrical generator 160 may be a rotary generator. The rotary generator 160 may be located within an enclosing structure, such as a sealed or partially sealed bulb, and may be attached to the piston assembly 125.

FIG. 2A depicts a cross-sectional view of an illustrative piston assembly according to some embodiments. As shown in FIG. 2A, the piston assembly 205 may contain a bidirectional turbine 215 connected to a rotary generator 210 via a shaft 220. As the piston rod 235 moves the piston assembly 205 in any direction perpendicular or substantially perpendicular to the blades of the bidirectional turbine (for example, in either a compression stroke or an extension stroke), the bidirectional turbine 215 will rotate unidirectionally. As the bidirectional turbine 215 rotates, the shaft 220 rotates unidirectionally such that the rotational energy of the bidirectional turbine may be transferred to the rotary generator 210. The rotary generator 210 may operate to generate electrical energy using the rotational energy according to rotary generator processes known to those having ordinary skill in the art. For example, a rotary generator 210 installed in an automotive shock absorber may generate up to about 25 W.

A sealing surface 230 of the piston assembly 205 may operate to seal the piston assembly with an inner surface of a housing (for example, housing 115 of FIG. 1) of the energy harvesting apparatus. As the outer sealing surface 230 of the piston assembly 205 is sealed against the inner surface of the housing, the fluid disposed within the housing is forced to move through the inside of the piston assembly and, therefore, in contact with the bidirectional turbine 215.

The rotary generator 210 may be connected to one or more electrical energy receivers 240, for example, through one or more electrical cables passing through the piston assembly 205. Illustrative energy receivers may include, but are not limited to, a battery, an electrical device, a vehicle electrical system, a sensor, and a transceiver. As such, the electrical energy produced by the rotary generator 210 may be used to power, in whole or in part, one or more electronic devices or may be stored in an energy storage device, such as a rechargeable battery.

In an embodiment, all or part of the inner walls 225 of the piston assembly 205 may be configured to constrict the flow of fluid contacting the piston assembly (for example, creating a venturi). Constricting the flow of fluid may operate to increase the velocity of the fluid as it approaches the bidirectional turbine 215 and, therefore, the angular momentum of the bidirectional turbine generated by the fluid rotating the bidirectional turbine. The greater the angular momentum of the bidirectional turbine 215, the more electrical energy that may be produced by the rotary generator 210. In this manner, an energy harvesting apparatus configured according to some embodiments disclosed herein may generate more units of electrical energy per units of mechanical energy than without all or part of the inner walls 225 of the piston assembly 205 being configured to constrict the flow of fluid contacting the piston assembly as it moves within the energy harvesting apparatus. In an embodiment, the bidirectional turbine 215 may be located at the minimum cross-section of the venturi created by the inner walls 225 so that the bidirectional turbine may contact a higher, or the highest, velocity of fluid.

Figure 2B:
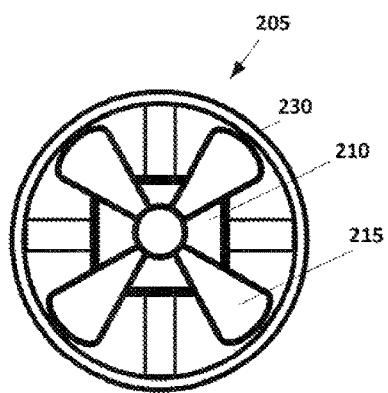
FIG. 2B depicts a bottom view of an illustrative piston assembly according to some embodiments.
Figure 2C:
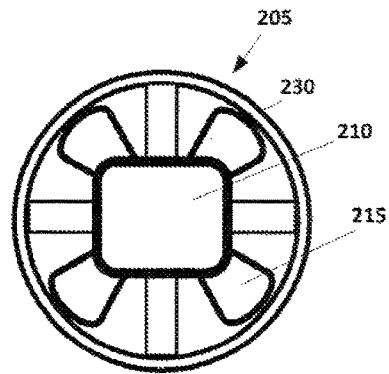
FIG. 2C depicts a top view of an illustrative piston assembly according to some embodiments.

FIG. 2B depicts a bottom view of an illustrative piston assembly according to some embodiments. FIG. 2C depicts a top view of an illustrative piston assembly according to some embodiments. The illustrative piston assembly 205 depicted in FIG. 2B and FIG. 2C includes a sealing surface 130, a rotary generator 210, and a bidirectional turbine 215 arranged according to an embodiment.

Figure 3:
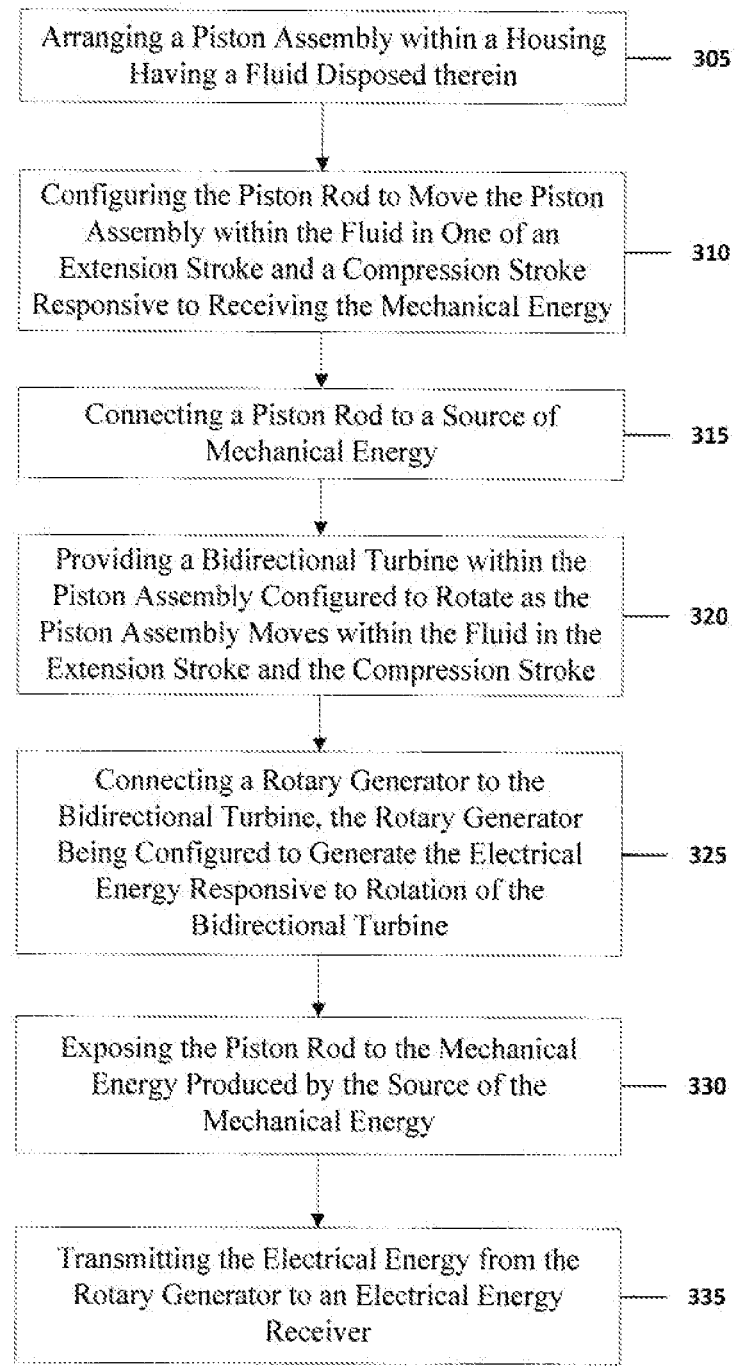
FIG. 3 depicts a flow diagram for an illustrative method of regenerating mechanical energy into electrical energy according to some embodiments.

FIG. 3 depicts a flow diagram for an illustrative method of regenerating mechanical energy into electrical energy according to some embodiments. A piston assembly may be arranged within a housing having a fluid disposed therein at block 305. In an embodiment, the housing may include a cylinder having a hard material such as steel or any other metal. The housing may be sealed to prevent the fluid from flowing outside of the housing. The piston assembly may be moveably arranged within the housing such that the piston assembly may slide distally and proximally (for example, up and down or side-to-side) within the housing.

The piston rod may be configured to move the piston assembly within the fluid in one of an extension stroke and a compression stroke responsive to receiving the mechanical energy from the source of the mechanical energy at block 310. For example, the piston rod may have a first end connected to a source of mechanical energy and may have a second end connected to the piston assembly. When the source of mechanical energy transfers energy to the piston rod, for instance, through a vibration that pushes the piston rod down, the piston rod moves downward pushing the piston assembly down in an extension stroke (for example, if the energy harvesting apparatus is positioned vertically as in FIG. 1). When the energy is removed and/or the energy is applied in the opposite direction, such as a vibration that pulls the piston rod up, the piston rod moves upward pulling the piston assembly up in a compression stroke.

The piston rod may be connected to a source of mechanical energy in block 315. For example, the piston rod may be attached to a vehicle or a vibrating component of a bridge. The piston rod may be mounted such that the mechanical energy generated by the source of mechanical energy may cause the piston rod to slidably move the piston assembly within the housing of the energy harvesting apparatus.

A bidirectional turbine may be provided within the piston assembly that is configured to rotate as the piston assembly moves within the fluid in the extension stroke and the compression stroke at block 320. As the piston rod moves the piston assembly within the fluid, the resistance of the fluid contacting the bidirectional turbine may cause the bidirectional turbine to rotate. The bidirectional nature of the bidirectional turbine allows the bidirectional turbine to rotate unidirectionally through the bidirectional flow generated by the extension stroke and the compression stroke.

A rotary generator may be connected to the bidirectional turbine that is configured to generate the electrical energy responsive to rotation of the bidirectional turbine at block 325. For example, the rotary generator may be connected to the bidirectional turbine through a shaft such that a bidirectional flow of fluid may rotate the bidirectional turbine unidirectionally, which, in turn, may rotate the shaft unidirectionally. The rotational energy of the shaft may be transferred to the rotary generator such that the components of the rotary generator correspondingly rotate to produce electrical energy.

The piston rod may be exposed to the mechanical energy generated by the source of the mechanical energy at block 330. The piston assembly may operate to move the piston assembly within the housing responsive to receiving the mechanical energy. For example, the source of mechanical energy may generate mechanical energy through one or more movements, such as vibrations or oscillations. As the piston rod is connected to the source of mechanical energy, the piston rod will also move responsive to the movements of the source of mechanical energy. For instance, as the source of mechanical energy vibrates, the mechanical energy resulting from the vibrations may be sufficient to move the piston rod up and down (or side-to-side) and, therefore, move the piston assembly in a corresponding motion within the energy harvesting apparatus. As the piston assembly moves within the energy harvesting apparatus, the bidirectional turbine may rotate and impart the resulting rotational energy to the rotary generator. Electrical energy may be produced by the rotary generator using the rotational energy.

The electrical energy produced by the rotary generator may be transmitted from the rotary generator to an electrical energy receiver at block 335. For example, an electrical cable may be in electrical communication with the piston assembly such that electrical energy produced by the rotary generator may be carried to an electrical receiver, such as an electronic device or a battery.

EXAMPLES

Example 1: Harvesting Mechanical Energy from a Vehicle

Figure 4A:
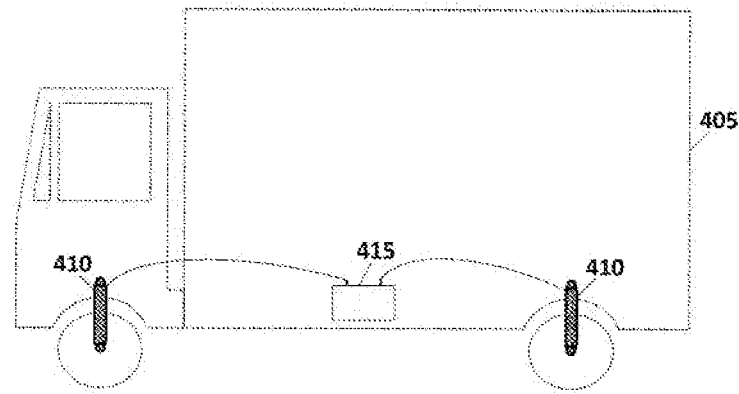
FIG. 4A depicts an illustrative vehicle configured with energy harvesting devices according to some embodiments.

A vehicle automobile will be equipped with shock absorbers configured to harvest energy in addition to dampening vibrations generated by the vehicle during operation. Four shock absorbers, one for each wheel, will be attached to the frame of the vehicle and to the axis of each wheel. The vehicle may be similar to the example illustrated in FIG. 4A depicting shock absorbers 410 attached to a vehicle 405.

As the vehicle is operated, vibrations will be generated from driving on a roadway and from forces produced during braking and/or acceleration. The vibrations will be transferred to the shock absorbers causing the piston assembly to move in both an extension stroke and a compression stroke within the shock absorbers. As the piston assembly moves, the bidirectional rotor will rotate, causing a shaft connected to a rotary generator to rotate as well. The rotational energy of the rotating shaft will be imparted to the rotary generator such that the rotary generator generates electrical energy in the range of about 20 W to about 25 W.

The shock absorbers will be connected to a rechargeable battery through an electrical cable such that the energy generated by the rotary generator will recharge the battery during operation of the vehicle. These connections may be similar to the illustration of FIG. 4A, wherein the shock absorbers are electrically connected to an electrical receiver 415 of the vehicle 405. The rechargeable battery will be connected to the electrical system of the vehicle and will be used to power certain electrical components therein.

Example 2: Underwater Energy Harvesting

Figure 4B:
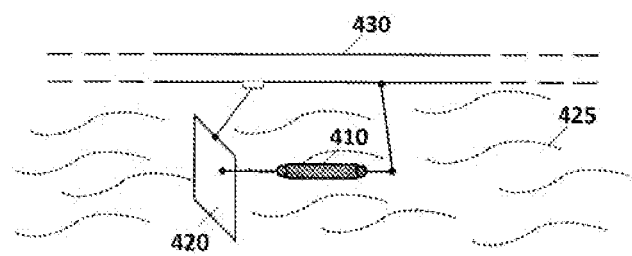
FIG. 4B depicts an illustrative of underwater energy harvesting according to some embodiments.

A flow barrier configured to move in response to contact with moving water will be positioned underwater. The flow barrier will be a substantially square metal sheet having dimensions of about 2 meters×2 meters×5 centimeters. The top side of the sheet will be attached to a fixed object such that the flow barrier may move back and forth within the water. The example illustration of FIG. 4B depicts an illustrative flow barrier 420 arranged within water 425 and connected to a fixed object 430 according to some embodiments. The fixed object will be the underside of an underwater drilling rig located in the ocean about 6 kilometers offshore.

The piston rod of an energy harvesting device will be connected to the flow barrier at one end and to a fixed object on the other end. The flow of the ocean will operate to move the flow barrier back and forth. As the flow barrier moves back and forth, the piston rod will be pulled out of the energy harvesting apparatus (compression stroke) and pushed into the energy harvesting device (extension stroke). The energy harvesting device may be connected in a manner similar to the energy harvesting device 410 depicted in FIG. 4B. The piston rod will operate to move the piston assembly within the energy harvesting device in a compression stroke and an extension stroke, causing the bidirectional rotor to rotate. A rotary generator connected to the bidirectional rotor will operate to generate electrical energy in response to the rotation of the bidirectional rotor.

The energy harvesting device will be electrically connected to a temperature sensor and a pressure sensor configured to measure the temperature and the pressure, respectively, of the water surrounding the underwater drilling rig. The electrical energy produced by the rotary generator will be used to power the temperature sensor and the pressure sensor.

Example 3: Harvesting Energy from Transportation Infrastructure

Figure 4C:
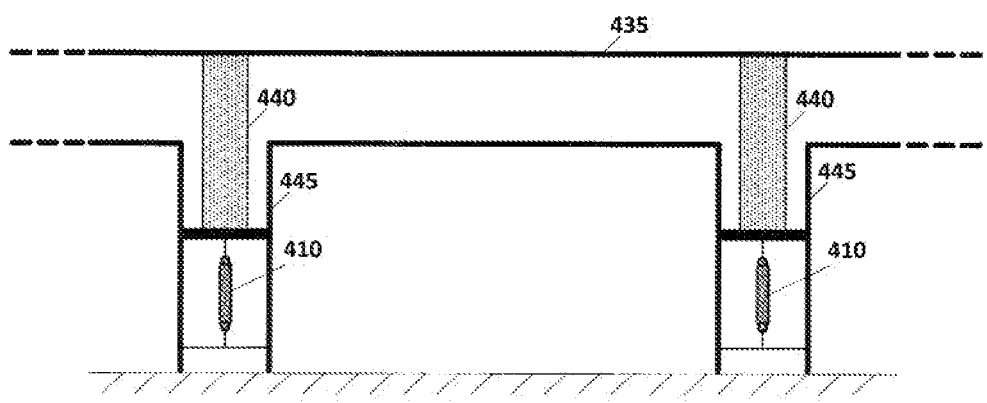
FIG. 4C depicts an illustrative of energy harvesting from transportation infrastructure according to some embodiments.

Two energy harvesting devices will be arranged within two supports of a bridge constructed for vehicle traffic. The bridge will be designed to transfer vibrational energy produced when vehicles drive on the bridge into the supports through one or more support structures. The bridge may be configured as illustrated in the example of FIG. 4C depicting a bridge 435 having two support structures 440 arranged within bridge supports 445 according to some embodiments.

The piston rod of the energy harvesting devices will be connected to the support structures such that the vibrational energy generated by traffic on the bridge will be transferred through the support structures to the piston rods. The energy harvesting devices may be connected in a manner similar to the energy harvesting devices 410 depicted in FIG. 4C. As the bridge vibrates, the piston rods will be pulled out of and pushed into the housing of the energy harvesting devices. The piston rods will therefore move the piston assemblies in an extension stroke and a compression stroke within the housings of the energy harvesting devices such that the bidirectional rotors rotate. One or more rotary generators will be attached to the piston assemblies and connected to the bidirectional rotors such that the rotation of the bidirectional rotors will impart rotational energy to the rotary generators. The rotary generators will use the rotational energy to produce electrical energy.

The energy harvesting devices will be electrically connected to a light positioned on the bridge to light the roadway at night. The electrical energy produced by the energy harvesting devices will be used, in combination with other electrical supply sources, to power the light.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A. B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

I claim:

1. An energy harvesting apparatus for regenerating mechanical energy into electrical energy, the energy harvesting apparatus comprising:
    a housing having a fluid disposed therein;
    a piston assembly arranged within the housing, the piston assembly comprising:
        a piston rod connected to a source of the mechanical energy, the piston rod configured to move the piston assembly within the fluid in one of an extension stroke and a compression stroke responsive to receiving the mechanical energy, and
        a bidirectional turbine arranged within the piston assembly, the bidirectional turbine configured to rotate as the piston assembly moves within the fluid in either of the extension stroke and the compression stroke, wherein the bidirectional turbine is configured to rotate in a single direction irrespective of whether the piston assembly is moving in the extension stroke or the compression stroke; and
    a rotary generator directly connected to the piston rod at one end and connected to the bidirectional turbine, via a shaft, at other end, wherein the rotary generator is configured to generate the electrical energy responsive to rotation of the bidirectional turbine.

2. The apparatus of claim 1, wherein the fluid comprises a hydraulic fluid.

3. The apparatus of claim 1, wherein the fluid comprises an oil.

4. The apparatus of claim 1, wherein the piston assembly comprises an inner chamber encompassing the bidirectional turbine, the inner chamber comprising a venturi configured to increase a velocity of the fluid contacting the bidirectional turbine by constricting a flow of the fluid as the fluid approaches the bidirectional turbine, and wherein the bidirectional turbine is located at a minimum cross-section of the venturi.

5. The apparatus of claim 1, wherein the rotary generator is connected to a cable configured to transmit the electrical energy from the rotary generator to an energy storage device.

6. The apparatus of claim 1, wherein the apparatus is configured as a shock absorber.

7. The apparatus of claim 1, wherein the mechanical energy comprises at least one of the following: vibrations, oscillations, human motion, wind, and water movement.

8. A method of manufacturing an energy harvesting device configured to regenerate mechanical energy into electrical energy, the method comprising:
    arranging a piston assembly within a housing having a fluid disposed therein, wherein the piston assembly comprises:
        a piston rod connected to a source of the mechanical energy, the piston rod configured to move the piston assembly within the fluid in one of an extension stroke and a compression stroke responsive to receiving the mechanical energy,
        a bidirectional turbine arranged within the piston assembly, the bidirectional turbine configured to rotate as the piston assembly moves within the fluid in either of the extension stroke and the compression stroke, wherein the bidirectional turbine is configured to rotate in a single direction irrespective of whether the piston assembly is moving in the extension stroke or the compression stroke, and
        an inner chamber that encompasses the bidirectional turbine, wherein the inner chamber comprises a venturi, created by inner walls of the inner chamber of the piston assembly, configured to increase a velocity of the fluid in contact with the bidirectional turbine by constricting a flow of the fluid as the fluid approaches the bidirectional turbine; and
    connecting a rotary generator to the bidirectional turbine, via a shaft, at one end, and directly to the piston rod at other end, wherein the rotary generator is configured to generate the electrical energy responsive to rotation of the bidirectional turbine.

9. The method of claim 8, wherein the fluid comprises a hydraulic fluid.

10. The method of claim 8, wherein the fluid comprises an oil.

11. The method of claim 8, wherein the bidirectional turbine is located at a minimum cross-section of the venturi.

12. The method of claim 8, further comprising transmitting the electrical energy from the rotary generator to an electrical energy receiver.

13. The method of claim 8, wherein the mechanical energy comprises at least one of the following: vibrations, oscillations, human motion, wind, and water flow.

14. A method of regenerating mechanical energy into electrical energy, the method comprising:
    providing a piston assembly arranged within a housing having a fluid disposed therein, wherein the piston assembly comprises:
        a piston rod connected to a source of the mechanical energy, and
        a bidirectional turbine arranged within the piston assembly;
    exposing the piston rod to the mechanical energy produced by the source such that the piston rod moves the piston assembly within the fluid in each of an extension stroke and a compression stroke;
    generating rotational energy by rotating the bidirectional turbine as the piston assembly moves within the fluid in each of the extension stroke and the compression stroke, wherein the bidirectional turbine rotates in a single direction irrespective of whether the piston rod is moving in the extension stroke or the compression stroke; and
    imparting the rotational energy to a rotary generator, which is directly connected to the piston rod at one end and connected to the bidirectional turbine, via a shaft, at other end, wherein the rotary generator is configured to generate the electrical energy responsive to receiving the rotational energy.

15. The method of claim 14, further comprising connecting the rotary generator to a cable configured to transmit the electrical energy from the rotary generator to an electrical energy receiver.

16. The method of claim 15, further comprising storing the electrical energy transmitted through the cable in a battery.

17. An energy harvesting apparatus for regenerating mechanical energy into electrical energy, the energy harvesting apparatus comprising:
    a housing having a fluid disposed therein;
    a first mount and a second mount;

a piston assembly arranged within the housing, wherein the piston assembly comprises:
  a piston rod connected to a frame of a source of the mechanical energy via the first mount and connected to an axis of the source of the mechanical energy via the second mount, wherein the piston rod is configured to move the piston assembly within the fluid in each of an extension stroke and a compression stroke responsive to receiving the mechanical energy, and
  a bidirectional turbine arranged within the piston assembly, the bidirectional turbine configured to rotate as the piston assembly moves within the fluid in each of the extension stroke and the compression stroke, wherein the bidirectional turbine is configured to rotate in a single direction irrespective of whether the piston assembly is moving in the extension stroke or the compression stroke; and
  a rotary generator directly connected to the piston rod at one end and connected to the bidirectional turbine, via a shaft, at other end, wherein the rotary generator is configured to generate the electrical energy responsive to rotation of the bidirectional turbine.

18. The apparatus of claim 17, wherein the fluid comprises a hydraulic fluid.

19. The apparatus of claim 17, wherein the fluid comprises an oil.

20. The apparatus of claim 17, wherein the rotary generator is connected to a cable configured to transmit the electrical energy from the rotary generator to an electrical energy receiver.

21. The apparatus of claim 17, wherein the mechanical energy comprises at least one of the following: vibrations, oscillations, human motion, wind, and water movement.

* * * * *